US012341373B2

(12) United States Patent
Shirazi

(10) Patent No.: US 12,341,373 B2
(45) Date of Patent: *Jun. 24, 2025

(54) POWER CONVERTERS WITH WIDE BANDGAP SEMICONDUCTORS

(71) Applicant: MILWAUKEE ELECTRIC TOOL CORPORATION, Brookfield, WI (US)

(72) Inventor: Omid H. Shirazi, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,775

(22) Filed: Mar. 4, 2024

(65) Prior Publication Data
US 2024/0204555 A1 Jun. 20, 2024

Related U.S. Application Data

(63) Continuation of application No. 17/050,856, filed as application No. PCT/US2020/050453 on Sep. 11, 2020, now Pat. No. 11,923,716.
(Continued)

(51) Int. Cl.
*H02J 7/02* (2016.01)
*H02J 7/00* (2006.01)
(Continued)

(52) U.S. Cl.
CPC .............. *H02J 7/02* (2013.01); *H02J 7/0013* (2013.01); *H02J 7/0044* (2013.01); *H02M 7/48* (2013.01);
(Continued)

(58) Field of Classification Search
CPC ....................................................... H02J 7/02
(Continued)

(56) References Cited

U.S. PATENT DOCUMENTS 5,463,252 A 10/1995 Jones et al.
5,543,703 A 8/1996 Kusase et al.
(Continued)

FOREIGN PATENT DOCUMENTS

CN 104409501 A 3/2015
CN 104966706 A 10/2015
(Continued)

OTHER PUBLICATIONS

International Search Report and Written Opinion for Application No. PCT/US2020/050453 dated Dec. 22, 2020 (9 pages).
(Continued)

*Primary Examiner* — Jerry D Robbins
(74) *Attorney, Agent, or Firm* — Michael Best & Friedrich LLP

(57) ABSTRACT

Power converting devices (100) for power tools. One embodiment provides a power converter device (100) including a power source (200), a power converter (210) coupled to the power source (200), and an electronic processor (220) coupled to the power converter (210) to control the operation of the power converter (210). The power converter (210) is configured to receive an input power in one form or at a first voltage from the power source and convert the input power to an output power in another form or at a second voltage. The power converter (210) includes at least one wide bandgap field effect transistor controlled by the electronic processor (220) to convert the input power to output power.

21 Claims, 8 Drawing Sheets

Related U.S. Application Data

(60) Provisional application No. 62/900,252, filed on Sep. 13, 2019.

(51) Int. Cl.
*H02M 7/48* (2007.01)
*H02M 7/5387* (2007.01)
*H02M 1/42* (2007.01)

(52) U.S. Cl.
CPC ....... *H02M 7/5387* (2013.01); *H02J 2207/20* (2020.01); *H02M 1/4225* (2013.01)

(58) Field of Classification Search
USPC .......................................................... 257/76
See application file for complete search history.

(56) References Cited

U.S. PATENT DOCUMENTS

| | | | |
|---|---|---|---|
| 5,708,352 A | 1/1998 | Umeda et al. | |
| 5,719,484 A | 2/1998 | Taniguchi et al. | |
| 5,719,486 A | 2/1998 | Taniguchi et al. | |
| 5,719,487 A | 2/1998 | Sato et al. | |
| 5,731,689 A | 3/1998 | Sato | |
| 5,731,690 A | 3/1998 | Taniquchi et al. | |
| 5,736,753 A | 4/1998 | Ohno et al. | |
| 5,742,498 A | 4/1998 | Taniguchi et al. | |
| 5,877,518 A | 3/1999 | Sakurai et al. | |
| 5,962,877 A | 10/1999 | Sakurai et al. | |
| 6,169,672 B1 | 1/2001 | Kimura et al. | |
| 6,248,461 B1 | 6/2001 | Abe et al. | |
| 6,850,424 B2 | 2/2005 | Baudelot et al. | |
| 6,950,317 B2 | 9/2005 | Lynch et al. | |
| 7,017,662 B2 | 3/2006 | Schultz et al. | |
| 7,116,567 B2 | 10/2006 | Shelton et al. | |
| 7,301,223 B2 | 11/2007 | Rodney et al. | |
| 7,304,378 B2 | 12/2007 | Osanai | |
| 7,307,425 B2 | 12/2007 | Freeman et al. | |
| 7,327,053 B2 | 2/2008 | Eckhardt et al. | |
| 7,442,932 B2 | 10/2008 | Schultz et al. | |
| 7,492,074 B1 | 2/2009 | Rittenhouse | |
| 7,554,220 B2 | 6/2009 | Sugawara | |
| 7,570,502 B2 | 8/2009 | Sugawara et al. | |
| 7,679,941 B2 | 3/2010 | Raju et al. | |
| 7,723,891 B2 | 5/2010 | Rittenhouse | |
| 7,768,066 B2 | 8/2010 | Onose et al. | |
| 7,787,270 B2 | 8/2010 | NadimpaaliRaju et al. | |
| 7,793,712 B2 | 9/2010 | Yamate et al. | |
| 7,868,510 B2 | 1/2011 | Rittenhouse | |
| 7,872,888 B2 | 1/2011 | Kuzumaki et al. | |
| 8,098,499 B2 | 1/2012 | Otremba | |
| 8,183,726 B2 | 5/2012 | Rittenhouse | |
| 8,253,299 B1 | 8/2012 | Rittenhouse | |
| 8,274,121 B2 | 9/2012 | Vorhaus | |
| 8,406,024 B2 | 3/2013 | Nakamura | |
| 8,471,622 B2 | 6/2013 | Ishikawa et al. | |
| 8,476,689 B2 | 7/2013 | Chang | |
| 8,519,916 B2 | 8/2013 | Vorhaus | |
| 8,541,271 B1 | 9/2013 | Vorhaus | |
| 8,569,811 B1 | 10/2013 | Vorhaus et al. | |
| 8,575,621 B1 | 11/2013 | Vorhaus | |
| 8,637,909 B1 | 1/2014 | Vorhaus | |
| 8,649,198 B2 | 2/2014 | Kuzumaki et al. | |
| 8,653,565 B1 | 2/2014 | Vorhaus | |
| 8,675,326 B2 | 3/2014 | Shono | |
| 8,729,739 B2 | 5/2014 | Lubomirsky et al. | |
| 8,742,628 B2 | 6/2014 | Urciuoli | |
| 8,755,205 B2 | 6/2014 | Azuma et al. | |
| 8,759,924 B1 | 6/2014 | Vorhaus | |
| 8,768,271 B1 | 7/2014 | Then et al. | |
| 8,786,072 B2 | 7/2014 | Standing | |
| 8,835,239 B1 | 9/2014 | Vorhaus | |
| 8,847,563 B2 | 9/2014 | Callanan | |
| 8,884,560 B2 | 11/2014 | Ito | |
| 8,896,034 B1 | 11/2014 | Vorhaus | |
| 8,928,363 B2 | 1/2015 | Hatanaka et al. | |
| 8,947,898 B2 | 2/2015 | Nakamura | |
| 8,954,021 B2 | 2/2015 | Then et al. | |
| 9,006,799 B2 | 4/2015 | Vorhaus | |
| 9,007,040 B2 | 4/2015 | Ikeda et al. | |
| 9,007,042 B2 | 4/2015 | Okuda et al. | |
| 9,041,187 B2 | 5/2015 | Standing | |
| 9,054,090 B2 | 6/2015 | Standing | |
| 9,064,709 B2 | 6/2015 | Then et al. | |
| 9,077,340 B2 | 7/2015 | Chang | |
| 9,099,490 B2 | 8/2015 | Dasgupta et al. | |
| 9,124,103 B2 | 9/2015 | Kawamoto et al. | |
| 9,130,570 B2 | 9/2015 | Fornage et al. | |
| 9,136,265 B2 | 9/2015 | Vorhaus | |
| 9,147,631 B2 | 9/2015 | Otremba et al. | |
| 9,147,644 B2 | 9/2015 | Standing | |
| 9,196,686 B2 | 11/2015 | Shitou | |
| 9,209,495 B2 | 12/2015 | Normann et al. | |
| 9,219,079 B2 | 12/2015 | Then et al. | |
| 9,225,176 B2 | 12/2015 | Choi et al. | |
| 9,225,258 B2 | 12/2015 | Shimomugi et al. | |
| 9,236,378 B2 | 1/2016 | Vorhaus | |
| 9,240,410 B2 | 1/2016 | Then et al. | |
| 9,246,428 B2 | 1/2016 | Yokozutsumi et al. | |
| 9,252,143 B2 | 2/2016 | Vorhaus | |
| 9,270,199 B2 | 2/2016 | Kobayashi et al. | |
| 9,290,097 B2 | 3/2016 | Steigerwald et al. | |
| 9,362,369 B2 | 6/2016 | Then et al. | |
| 9,397,188 B2 | 7/2016 | Then et al. | |
| 9,401,612 B2 | 7/2016 | Kinzer et al. | |
| 9,461,547 B2 | 10/2016 | Liu et al. | |
| 9,472,549 B2 | 10/2016 | Rose et al. | |
| 9,484,839 B2 * | 11/2016 | Fujisaki | H02M 3/158 |
| 9,496,205 B2 | 11/2016 | Standing | |
| 9,496,245 B2 | 11/2016 | Standing | |
| 9,502,379 B2 | 11/2016 | Chang | |
| 9,509,233 B2 * | 11/2016 | Ide | H02M 3/156 |
| 9,510,436 B2 | 11/2016 | Borowy et al. | |
| 9,536,871 B2 | 1/2017 | Vorhaus | |
| 9,537,338 B2 | 1/2017 | Kinzer et al. | |
| 9,537,389 B2 | 1/2017 | Koji et al. | |
| 9,537,423 B2 | 1/2017 | Mao | |
| 9,570,927 B2 | 2/2017 | Kinzer et al. | |
| 9,571,093 B2 | 2/2017 | Kinzer et al. | |
| 9,583,574 B2 | 2/2017 | Dasgupta et al. | |
| 9,590,069 B2 | 3/2017 | Dasgupta et al. | |
| 9,595,512 B2 | 3/2017 | Standing | |
| 9,609,698 B2 | 3/2017 | Mihara et al. | |
| 9,613,891 B2 | 4/2017 | Kinzer | |
| 9,640,471 B2 | 5/2017 | Kinzer | |
| 9,647,476 B2 | 5/2017 | Kinzer et al. | |
| 9,673,692 B2 | 6/2017 | Drobnik | |
| 9,680,395 B2 | 6/2017 | Torrico-Bascope | |
| 9,685,502 B2 | 6/2017 | Wood | |
| 9,685,869 B1 | 6/2017 | Kinzer et al. | |
| 9,691,857 B2 | 6/2017 | Then et al. | |
| 9,711,600 B2 | 7/2017 | Mochizuki et al. | |
| 9,712,070 B2 | 7/2017 | Jimichi et al. | |
| 9,716,149 B2 | 7/2017 | Then et al. | |
| 9,716,395 B2 | 7/2017 | Kinzer et al. | |
| 9,722,609 B2 | 8/2017 | Kinzer et al. | |
| 9,744,855 B2 | 8/2017 | Tanaka | |
| 9,755,630 B2 | 9/2017 | Urciuoli | |
| 9,780,685 B2 | 10/2017 | Jimichi et al. | |
| 9,780,716 B2 | 10/2017 | El-Refaie et al. | |
| 9,787,105 B2 | 10/2017 | Choi et al. | |
| 9,806,072 B2 | 10/2017 | Chang | |
| 9,812,895 B2 | 11/2017 | Kawamura et al. | |
| 9,819,275 B2 | 11/2017 | Otake et al. | |
| 9,831,786 B2 | 11/2017 | Okayama et al. | |
| 9,837,393 B2 | 12/2017 | Standing | |
| 9,853,643 B2 | 12/2017 | Chang et al. | |
| 9,859,732 B2 | 1/2018 | Kinzer et al. | |
| 9,859,808 B2 | 1/2018 | Wagoner et al. | |
| 9,893,620 B2 | 2/2018 | Ikeda et al. | |
| 9,899,328 B2 | 2/2018 | Tamada et al. | |
| 9,923,087 B2 | 3/2018 | Dasgupta et al. | |
| 9,929,079 B2 | 3/2018 | Kinzer | |
| 9,929,636 B2 | 3/2018 | Shinomoto et al. | |

(56) References Cited

U.S. PATENT DOCUMENTS

| | | |
|---|---|---|
| 9,935,569 B2 | 4/2018 | Tsumura et al. |
| 9,935,625 B2 | 4/2018 | Yamaguchi |
| 9,956,932 B2 | 5/2018 | McBeth |
| 9,960,259 B2 | 5/2018 | Tega et al. |
| 9,960,620 B2 | 5/2018 | Kinzer et al. |
| 9,960,764 B2 | 5/2018 | Kinzer et al. |
| 9,978,852 B2 | 5/2018 | Renaud |
| 9,985,552 B2 | 5/2018 | Ikarashi et al. |
| 10,003,264 B2 | 6/2018 | Uenaka et al. |
| 10,023,072 B2 | 7/2018 | Ogale |
| 10,038,392 B2 | 7/2018 | Ohnishi et al. |
| 10,049,884 B2 | 8/2018 | Wood |
| 10,083,948 B2 | 9/2018 | Yasui et al. |
| 10,084,388 B2 | 9/2018 | Takahashi et al. |
| 10,090,760 B2 | 10/2018 | Kobayashi et al. |
| 10,096,683 B2 | 10/2018 | Then et al. |
| 10,109,549 B2 | 10/2018 | Hirao et al. |
| 10,116,228 B2 | 10/2018 | Ohnishi et al. |
| 10,134,727 B2 | 11/2018 | Then et al. |
| 10,135,275 B2 | 11/2018 | Kinzer et al. |
| 10,148,166 B2 | 12/2018 | Yamashita et al. |
| 10,148,190 B2 | 12/2018 | Takabayashi |
| 10,148,206 B2 | 12/2018 | Schnetzka et al. |
| 10,170,612 B2 | 1/2019 | Dasgupta et al. |
| 10,170,922 B1 | 1/2019 | Kinzer et al. |
| 10,186,581 B2 | 1/2019 | Then et al. |
| 10,186,982 B2 | 1/2019 | Morin |
| 10,186,983 B2 | 1/2019 | Morin |
| 10,193,544 B2 | 1/2019 | Bhat et al. |
| 10,199,477 B2 | 2/2019 | Renaud |
| 10,211,719 B2 | 2/2019 | Tanaka |
| 2002/0149345 A1 | 10/2002 | Takano et al. |
| 2003/0058597 A1 | 3/2003 | Bruckmann et al. |
| 2005/0104104 A1 | 5/2005 | Schultz et al. |
| 2007/0103951 A1 | 5/2007 | Ishikawa et al. |
| 2008/0284482 A1 | 11/2008 | Ishikawa |
| 2009/0225573 A1 | 9/2009 | Sugawara |
| 2010/0320014 A1 | 12/2010 | Woody et al. |
| 2010/0330403 A1 | 12/2010 | Normann |
| 2012/0126728 A1 | 5/2012 | El-Refaie et al. |
| 2012/0126741 A1 | 5/2012 | El-Refaie et al. |
| 2012/0155139 A1 | 6/2012 | Boeke |
| 2013/0169035 A1 | 7/2013 | Nakashima |
| 2013/0294128 A1 | 11/2013 | White |
| 2014/0085954 A1 | 3/2014 | Hasegawa et al. |
| 2014/0133202 A1 | 5/2014 | Tamaoka |
| 2014/0334214 A1 | 11/2014 | Katoh et al. |
| 2015/0041820 A1 | 2/2015 | Renaud |
| 2015/0194903 A1 | 7/2015 | Harada |
| 2015/0332988 A1 | 11/2015 | Standing |
| 2016/0057824 A1 | 2/2016 | Hu et al. |
| 2016/0141951 A1 | 5/2016 | Mao et al. |
| 2016/0197503 A1 | 7/2016 | Steigerwald et al. |
| 2016/0254755 A1* | 9/2016 | Deboy .............. H02M 3/33546 363/21.02 |
| 2016/0276927 A1 | 9/2016 | Das et al. |
| 2016/0300809 A1 | 10/2016 | Miyazaki et al. |
| 2017/0040890 A1 | 2/2017 | Barkley et al. |
| 2017/0155340 A1 | 6/2017 | Luan et al. |
| 2017/0162483 A1 | 6/2017 | Kinzer |
| 2017/0179842 A1 | 6/2017 | Tanaka et al. |
| 2017/0217320 A1 | 8/2017 | El-Refaie et al. |
| 2017/0229978 A1 | 8/2017 | Ayai et al. |
| 2017/0232853 A1 | 8/2017 | Lazarev et al. |
| 2017/0233528 A1 | 8/2017 | Sharp et al. |
| 2017/0236641 A1 | 8/2017 | Furuta et al. |
| 2017/0236642 A1 | 8/2017 | Furuta et al. |
| 2017/0236648 A1 | 8/2017 | Lazarev et al. |
| 2017/0237271 A1 | 8/2017 | Kelly-Morgan et al. |
| 2017/0237274 A1 | 8/2017 | Lazarev et al. |
| 2017/0237355 A1 | 8/2017 | Stieneker et al. |
| 2017/0237360 A1 | 8/2017 | Takabayashi et al. |
| 2017/0257050 A1 | 9/2017 | El-Refaie et al. |
| 2017/0258376 A1 | 9/2017 | Ram et al. |
| 2017/0324263 A1 | 11/2017 | Kinzer et al. |
| 2017/0338734 A1 | 11/2017 | Nakashima et al. |
| 2017/0349053 A1 | 12/2017 | Landseadel |
| 2018/0023529 A1 | 1/2018 | Huang |
| 2018/0061582 A1 | 3/2018 | Furuta et al. |
| 2018/0090472 A1 | 3/2018 | Disney |
| 2018/0102661 A1 | 4/2018 | Kinzer et al. |
| 2018/0115237 A1 | 4/2018 | Morin |
| 2018/0123476 A1 | 5/2018 | Schutten et al. |
| 2018/0126857 A1 | 5/2018 | Kelly-Morgan |
| 2018/0131277 A1 | 5/2018 | Gatard et al. |
| 2018/0151709 A1 | 5/2018 | Yoshimoto et al. |
| 2018/0182752 A1 | 6/2018 | Chang |
| 2018/0205242 A1 | 7/2018 | Kelly-Morgan et al. |
| 2018/0212605 A1 | 7/2018 | Chang et al. |
| 2018/0262013 A1 | 9/2018 | Morin |
| 2018/0287544 A1 | 10/2018 | Kato et al. |
| 2018/0301549 A1 | 10/2018 | Takeuchi et al. |
| 2018/0309410 A1 | 10/2018 | Gatard et al. |
| 2018/0323707 A1 | 11/2018 | Yuyama et al. |
| 2018/0331174 A1 | 11/2018 | Tega et al. |
| 2018/0335792 A1 | 11/2018 | Kuchipudi |
| 2019/0016225 A1 | 1/2019 | Zies et al. |
| 2019/0021622 A1 | 1/2019 | Ram et al. |
| 2019/0021623 A1 | 1/2019 | Ram et al. |
| 2019/0043969 A1 | 2/2019 | Wood |
| 2019/0044357 A1 | 2/2019 | Kinzer et al. |
| 2019/0058414 A1* | 2/2019 | Ohnishi ................ H02M 7/487 |
| 2019/0149053 A1 | 5/2019 | Bala |
| 2019/0173388 A1* | 6/2019 | Suryanarayana . H02M 3/33592 |
| 2019/0199101 A1 | 6/2019 | Hennesy |
| 2021/0265917 A1* | 8/2021 | Malone ................ H02J 7/0071 |
| 2021/0344258 A1* | 11/2021 | Singh ..................... H05K 1/144 |
| 2023/0074825 A1* | 3/2023 | Namuduri ............... B60L 53/30 |
| 2023/0327660 A1* | 10/2023 | Sabate .............. H02M 3/33573 |

FOREIGN PATENT DOCUMENTS

| | | |
|---|---|---|
| CN | 105023893 A | 11/2015 |
| CN | 205377735 U | 7/2016 |
| CN | 104241338 B | 6/2017 |
| CN | 106849296 A | 6/2017 |
| CN | 108512425 A | 9/2018 |
| DE | 102013102433 A1 | 9/2013 |
| DE | 102013213801 A1 | 6/2014 |
| DE | 102015209018 B3 | 9/2016 |
| DE | 102016204484 A1 | 9/2016 |
| DE | 102016202386 B3 | 8/2017 |
| DE | 102017208925 A1 | 11/2018 |
| DE | 102017212856 A1 | 1/2019 |
| EP | 0788169 A2 | 8/1997 |
| EP | 2523333 A1 | 11/2012 |
| EP | 2523334 A1 | 11/2012 |
| EP | 2713494 A1 | 4/2014 |
| EP | 2713499 A1 | 4/2014 |
| EP | 2903160 A1 | 8/2015 |
| JP | 6577663 B2 | 9/2019 |
| WO | 2000072433 A1 | 11/2000 |
| WO | 2012131768 A1 | 10/2012 |
| WO | 2013010805 A2 | 1/2013 |
| WO | 2015063957 A1 | 5/2015 |
| WO | 2016021077 A1 | 2/2016 |
| WO | 2016042621 A1 | 3/2016 |
| WO | 2016084141 A1 | 6/2016 |
| WO | 2016098178 A1 | 6/2016 |
| WO | 2017001024 A1 | 1/2017 |
| WO | 2017139284 A2 | 8/2017 |
| WO | 2017202900 A1 | 11/2017 |
| WO | 2018042636 A1 | 3/2018 |
| WO | 2018046231 A1 | 3/2018 |
| WO | 2018092751 A1 | 5/2018 |
| WO | 2018138530 A1 | 8/2018 |
| WO | 2018138532 A1 | 8/2018 |
| WO | 2018139172 A1 | 8/2018 |
| WO | 2018156934 A1 | 8/2018 |
| WO | 2018158453 A1 | 9/2018 |

(56) References Cited

FOREIGN PATENT DOCUMENTS

| | | |
|---|---|---|
| WO | 2019011506 A2 | 1/2019 |
| WO | 2019109950 A1 | 6/2019 |

OTHER PUBLICATIONS

Extended European Search Report for Application No. 20863093.9 dated Aug. 25, 2023 (13 pages).
Chinese Patent Office Action for Application No. 202080062700.7 dated Jan. 25, 2025 (31 pages including machine English translation).

\* cited by examiner

POWER CONVERTERS WITH WIDE BANDGAP SEMICONDUCTORS

RELATED APPLICATIONS

This application is a continuation of and claims the benefit of U.S. patent application Ser. No. 17/050,856, filed Oct. 27, 2020, which granted as U.S. Pat. No. 11,923,716 on Mar. 5, 2024, which claims priority to U.S. Provisional Patent Application No. 62/900,252, filed on Sep. 13, 2019, the entire content of which is hereby incorporated by reference.

FIELD

The present disclosure relates to power converter devices such as chargers, AC/DC adapters, battery powered mobile power supplies, and the like.

BACKGROUND

Several kinds of cordless direct-current (DC) power tools and corded alternating-current (AC) power tools are used at construction sites and other locations. Operating power may not always be available in both AC and DC forms at a particular location, and a user may have a power tool that uses a power form not available. For example, the user may have an AC power tool at a location without AC power available.

SUMMARY

Power converting devices can convert power available in one form (e.g., DC) to power in another form (e.g., AC) to enable power tools and other devices to operate regardless of the form of power available at a particular location. However, power converting devices include internal converters that are bulky, heavy, and lack efficiency during operation. For example, some portable power supplies use an inverter including several metal oxide semiconductor field effect transistors (MOSFETs) for converting power from DC to AC. MOSFET based designs are large, heavy, and lose high amounts of energy as heat when operated at high-frequencies. To get more power out of the MOSFET based designs, additional circuitry and heat sinking features are used that add to the size and weight of the portable power supply. Additionally, MOSFETs cannot operate efficiently at high switching frequencies. This, in turn, results in the use of large passive components due to low frequency operation of MOSFETs. Other power converter devices have similar problems when using MOSFETs in power conversion circuitry.

Accordingly, there is a need for power converting solutions that are smaller, lighter, and more efficient, and a need for switches in power converting devices that are more efficient at high-frequencies.

Portable power sources described herein include a housing, a battery coupled on the housing, an outlet provided on the housing and configured to provide power to a device external to the portable power source, a power converter coupled between the battery and the outlet and configured to convert power received from the battery. The power converter includes a first wide bandgap field effect transistor (FET). The portable power sources also include an electronic processor coupled to the power converter and configured control operation of the power converter by controlling the first wide bandgap FET.

In some aspects, the battery has a nominal voltage between 12 Volts (V) and 680 V. In some aspects, the nominal voltage is between 12 V and 1200 V.

In some aspects, the housing includes a battery pack interface to receive the battery, and wherein the battery is a power tool battery pack having a nominal voltage selected from a group consisting of: 12 V, 18 V, 60 V, 80 V, and between 12 V and 80 V.

In some aspects, the power converter includes an inverter including the first wide bandgap FET and is configured to convert direct-current (DC) power received from the battery to alternating-current (AC) power, wherein the AC power is provided at the outlet.

In some aspects, the electronic processor controls the first wide bandgap FET at a switching frequency of at least 100 kilo-Hertz (kHz). In some aspects, the switching frequency is at least 125 kHz.

In some aspects, the power converter further includes a DC-to-DC converter configured to convert DC power received from the battery pack at a first voltage to DC power at a second voltage, and provide DC power at the second voltage to the inverter, wherein the DC-to-DC converter includes a second wide bandgap FET.

In some aspects, the electronic processor controls the second wide bandgap FET at a switching frequency of at least 200 kHz. In some aspects, the switching frequency is at least 400 kHz.

In some aspects, the inverter includes a first bridge circuit having a first high-side FET and a first low-side FET, and a second bridge circuit having a second high-side FET and a second low-side FET, wherein at least one of the first high-side FET, the first low-side FET, the second high-side FET, and the second low-side FET is the first wide bandgap FET, and wherein at least another of the first high-side FET, the first low-side FET, the second high-side FET, and the second low-side FET is a metal oxide semiconductor field effect transistor (MOSFET).

In some aspects, the first high-side FET is the first wide bandgap FET and the first low-side FET is a second wide bandgap FET, and the second high-side FET and the second low-side FET are MOSFETs.

In some aspects, the first high-side FET is the first wide bandgap FET and the second high-side FET is a second wide bandgap FET, and wherein the first low-side FET and the second low-side FET are MOSFETs.

In some aspects, the first low-side FET is the first wide bandgap FET and the second low-side FET is a second wide bandgap FET, and wherein the first high-side FET and the second high-side FET are MOSFETs.

In some aspects, the electronic processor operates the first wide bandgap FET at a first frequency and operates the MOSFET at a second frequency, and wherein the first frequency is higher than a second frequency.

In some aspects, the power converter includes a DC-to-DC converter having the first wide bandgap FET and is configured to convert DC power received from the battery pack at a first voltage to a second voltage, and the DC power at the second voltage is provided at the outlet.

In some aspects, the electronic processor controls the first wide bandgap FET at a switching frequency of at least 200 (kHz). In some aspects, the switching frequency is at least 400 kHz.

In some aspects, the electronic processor controls the first wide bandgap FET at a switching frequency between 100 kHz and 400 kHz.

In some aspects, the portable power source includes a power input provided on the housing to receive AC power from an external source and a second power converter coupled between the power input and the battery and configured to convert power received from the power input. The power converter includes a second wide bandgap field effect transistor (FET).

In some aspects, the second power converter includes an AC-to-DC converter having the first wide bandgap FET and configured to convert AC power received from the power input to DC power provided to the battery for charging the battery.

Power tool battery pack chargers described herein provide a housing, a power input provided on the housing to receive AC power from an external source, a first battery pack interface provided on the housing and configured to receive a first-type of power tool battery pack, and a power converter coupled between the power input and the first battery pack interface and configured to convert power received from the power input. The power converter includes a first wide bandgap field effect transistor (FET). The power tool battery pack chargers also include an electronic processor coupled to the power converter and configured control operation of the power converter by controlling the first wide bandgap FET.

In some aspects, a second battery pack interface is provided on the housing and is configured to receive a second-type of power tool battery pack, wherein the second-type of power tool battery pack has a higher nominal voltage than the first-type of power tool battery pack, and wherein the power converter is further coupled between the power input and the second battery pack interface.

In some aspects, the power converter includes an AC-to-DC converter having the first wide bandgap FET and configured to convert AC power received from the power input to DC power provided to the first battery pack interface for charging the first-type of power tool battery pack.

In some aspects, the electronic processor controls the first wide bandgap FET at a switching frequency of at least 200 (kHz). In some aspects, the switching frequency is at least 400 kHz.

In some aspects, the power converter is an active clamp flyback converter.

In some aspects, the electronic processor controls the first wide bandgap FET at a switching frequency between 100 kHz and 400 kHz.

AC/DC adapter assemblies described herein include a power box, a power input provided on the power box to receive AC power from an external source, an adapter coupled to the power box and including a power tool interface configured to plug into a battery pack interface of a power tool, a power converter coupled between the power input and the adapter and configured to convert power received from the power input, the power converter including a first wide bandgap field effect transistor (FET), and an electronic processor coupled to the power converter and configured control operation of the power converter by controlling the first wide bandgap FET.

In some aspects, an adapter cord couples the power box to the adapter.

In some aspects, the power tool is a heavy duty power tool configured to operate at a voltage rating between 60 V and 120 V.

In some aspects, the power converter includes an AC-to-DC converter including the first wide bandgap FET and is configured to convert AC power received from the power input to DC power provided to the adapter.

In some aspects, the electronic processor controls the first wide bandgap FET at a switching frequency of at least 200 (kHz). In some aspects, the switching frequency is at least 400 kHz.

In some aspects, the power converter is an LLC converter.

In some aspects, the electronic processor controls the first wide bandgap FET at a switching frequency between 100 kHz and 400 kHz.

One embodiment provides a power converter device including a power source, a power converter coupled to the power source, and an electronic processor coupled to the power converter to control the operation of the power converter. The power converter is configured to receive an input power in one form from the power source and convert the input power to an output power in another form. The power converter includes at least one wide bandgap field effect transistors controlled by the electronic processor to convert the input power to output power.

In one example, the electronic processor controls the at least one wide bandgap field effect transistor at a switching frequency of at least 100 kHz, for example, when the power converter is an inverter. In one example, the switching frequency is at least 125 kHz.

In another example, the electronic processor controls the at least one wide bandgap field effect transistor at a switching frequency of at least 200 kHz, for example, when the power converter is a DC-to-DC converter.

In one example, the power converter is one or more selected from a group consisting of: a Full-Bridge converter, a flyback converter, an active clamp flyback converter, an LLC converter, and a power factor correction converter.

In another example, the power converter device is one selected from a group consisting of: a power tool battery pack charger, an AC/DC adapter assembly, and a portable power supply.

Another embodiment provides a power converter device including a power source, a power converter coupled to the power source, and an electronic processor coupled to the power converter to control the operation of the power converter. The power converter configured to receive an input power in one form from the power source and convert the input power to an output power in another form. The power converter includes at least one wide bandgap FET and at least one MOSFET. The wide bandgap FET is operated at a first frequency and the MOSFET is operated at a second frequency by the electronic processor to convert the input power to output power. The first frequency is higher than the second frequency.

In one example, the power converter is a Full-Bridge converter.

In another example, the power converter device is a portable power supply.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1A:
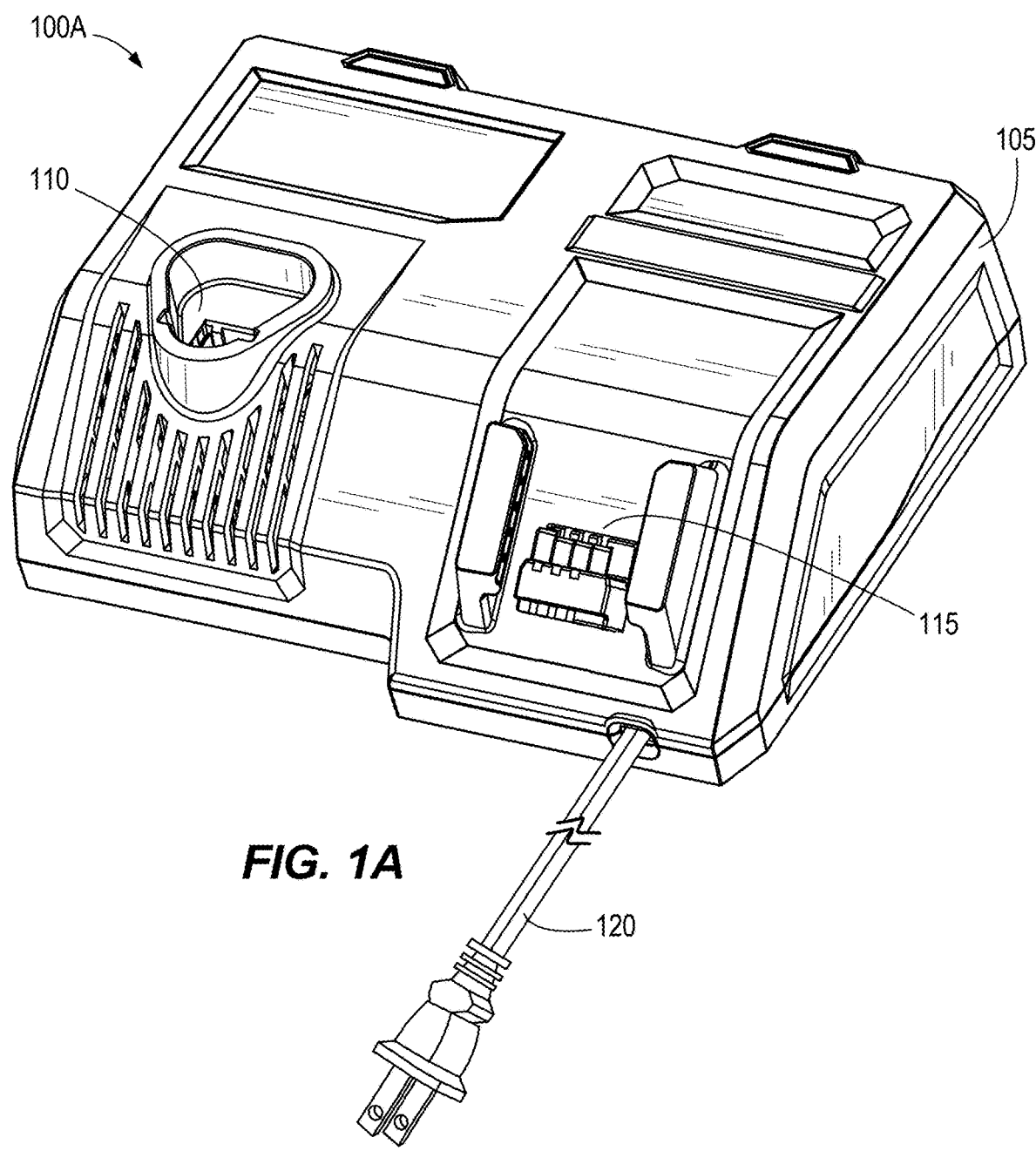
FIG. 1A is a perspective view of a power converter device embodied as a power tool battery pack charger, in accordance with some embodiments.
Figure 1B:
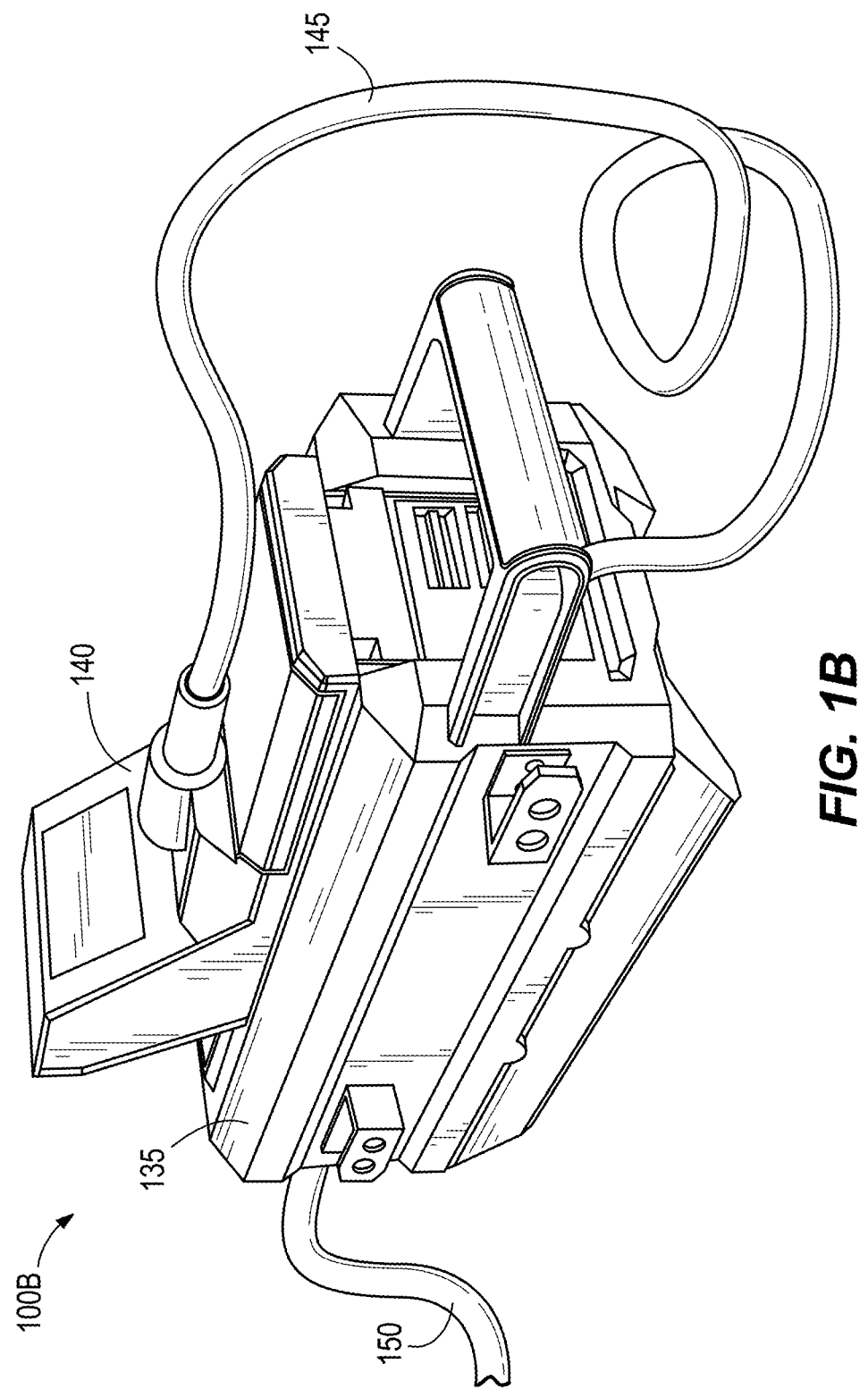
FIG. 1B is a perspective view of a power converter device embodied as an AC/DC power adapter, in accordance with some embodiments.
Figure 1C:
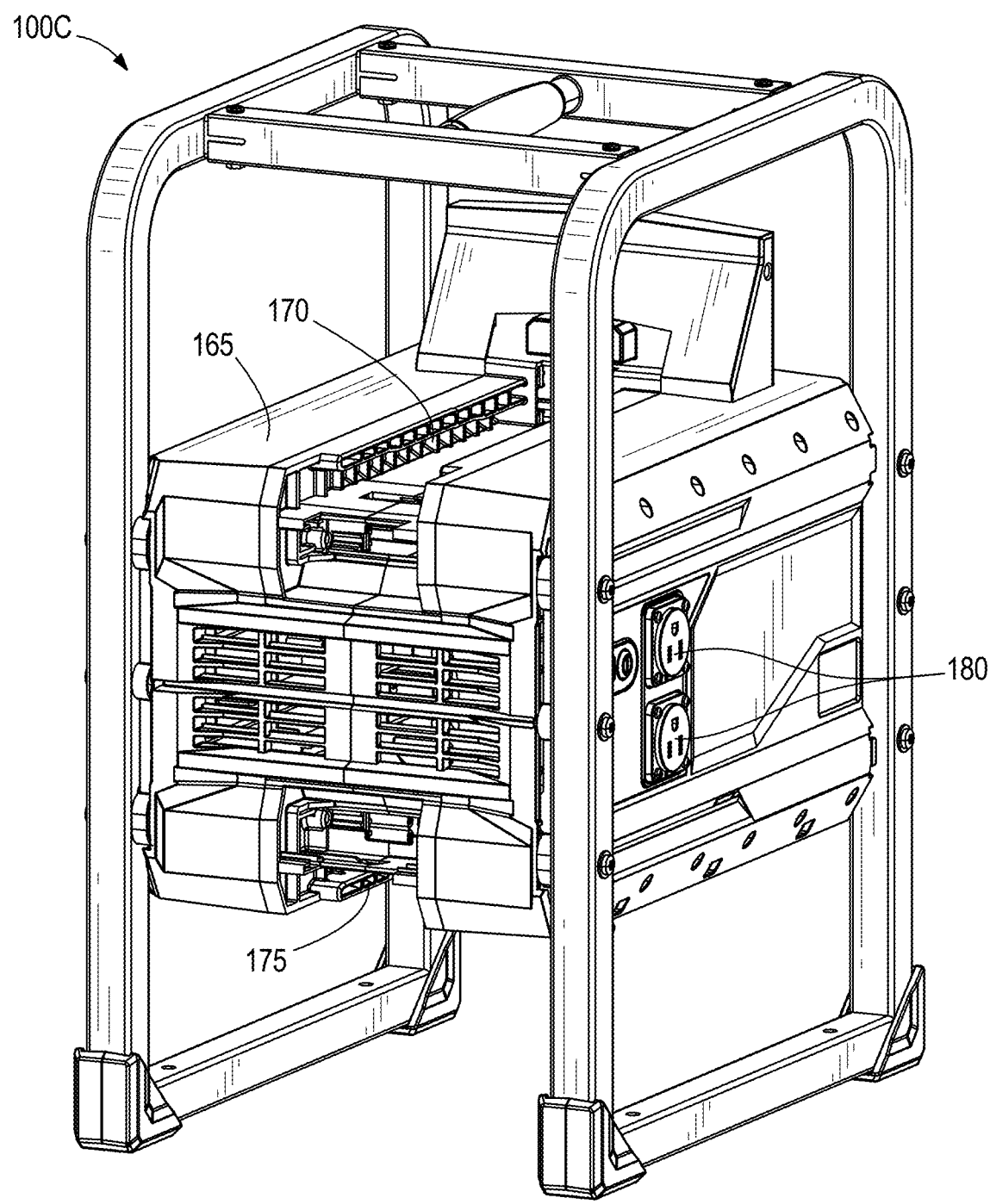
FIG. 1C is a perspective view of a power converter device embodied as a portable power supply, in accordance with some embodiments.

Power converter devices 100A-100C are illustrated in FIGS. 1A-1C. The power converter devices 100A-100C are singularly referred to as a power converter device 100 and collectively referred to as power converter devices 100. The power converter devices 100 are used for various purposes associated with the operation of power tools at work sites. Further, the power converter device 100A may be more particularly referred to as a charger 100A (see FIG. 1A). The power converter device 100B may be more particularly referred to as an AC/DC adapter assembly 100B (see FIG. 1B). The power converter device 100C may be more particularly referred to as a portable power supply 100C (see FIG. 1C).

With reference to FIG. 1A, the charger 100A (e.g., power converter device) is a charger for power tool battery packs and is illustrated as including a housing 105, a first recess 110 on the housing 105 to receive a first-type of battery pack, a second recess 115 on the housing to receive a second-type of battery pack (e.g., having a higher nominal voltage than the first-type of battery pack), and a power cord 120. The power cord 120 can be plugged into, for example, a wall outlet to provide AC power to the charger 100A. The charger 100A converts the AC power to DC power and provides the DC power to charge the battery packs.

With reference to FIG. 1B, the AC/DC adapter assembly 100B (e.g., power converter device) is illustrated as including a power box 135, an adapter 140, an adapter cord 145, and an adapter power cord 150. The adapter power cord 150 can be plugged into, for example, a wall outlet to provide AC power to the power box 135. The power box 135 converts the AC power to DC power and provides the DC power to operate heavy duty power tools through the adapter 140. The heavy duty power tools are configured to operate at voltages rating from, for example, 60 V, 80 V, 120 V, and higher. The heavy duty power tools typically receive a battery pack at a battery pack interface on the power tools. The adapter 140 includes a power tool interface that mates with the battery pack interface on the power tools. The adapter cord 145 provides the DC power from the power box 135 to the adapter 140.

With reference to FIG. 1C, the portable power source 100C (e.g., power converter device) is illustrated as including a housing 165. The housing 165 has a first interface 170 provided at the top of the housing 165 to receive a first heavy duty battery pack and a second interface 175 at the bottom of the housing 165 to receive a second heavy duty battery pack. The heavy duty battery packs are, for example, battery packs used to power the heavy duty power tools as described above. The heavy duty battery packs have a nominal output voltage of, for example, at least 60 V, 80 V, 120 V, and higher. The housing 165 includes power conversion circuitry, for example, an inverter to convert the DC power from the heavy duty battery packs to AC power to be provided at AC outlets 180. The AC outlets 180 are provided on the housing 165 to power, for example, corded AC power tools.

In some embodiments, the portable power source 100C may include an internal non-removable battery rather than interfaces to receive battery packs. The internal battery may have a nominal voltage between 40 V and 60 V. In one embodiment, the internal battery has a nominal voltage of 50.4 V. In some embodiments the internal battery may be expandable such that battery cells may be removed or added to the internal battery by a technician. In this example, the internal battery voltage may vary between 12 V and 680 V or higher based on the configuration of the battery cells in the internal battery. In one example, the internal battery voltage may be between 12 V and 1200 V DC for a three-phase AC power source. The portable power source 100C may include other forms of converters other than an inverter. For example, the portable power source 100C may include a DC-DC converter as further described below. By providing a high voltage internal battery as described above, some of the electronic circuitry may be reduced. For example, providing higher voltage internal battery allows for skipping a boost DC-to-DC converter and allows for providing the voltage of the internal battery directed to the inverter. In some embodiments the portable power source 100C illustrated in FIG. 1C may receive lower-voltage battery packs, for example, power tool battery packs. In one example, the portable power source 100C may receive 12 V and/or 18 V battery packs.

Figure 2:
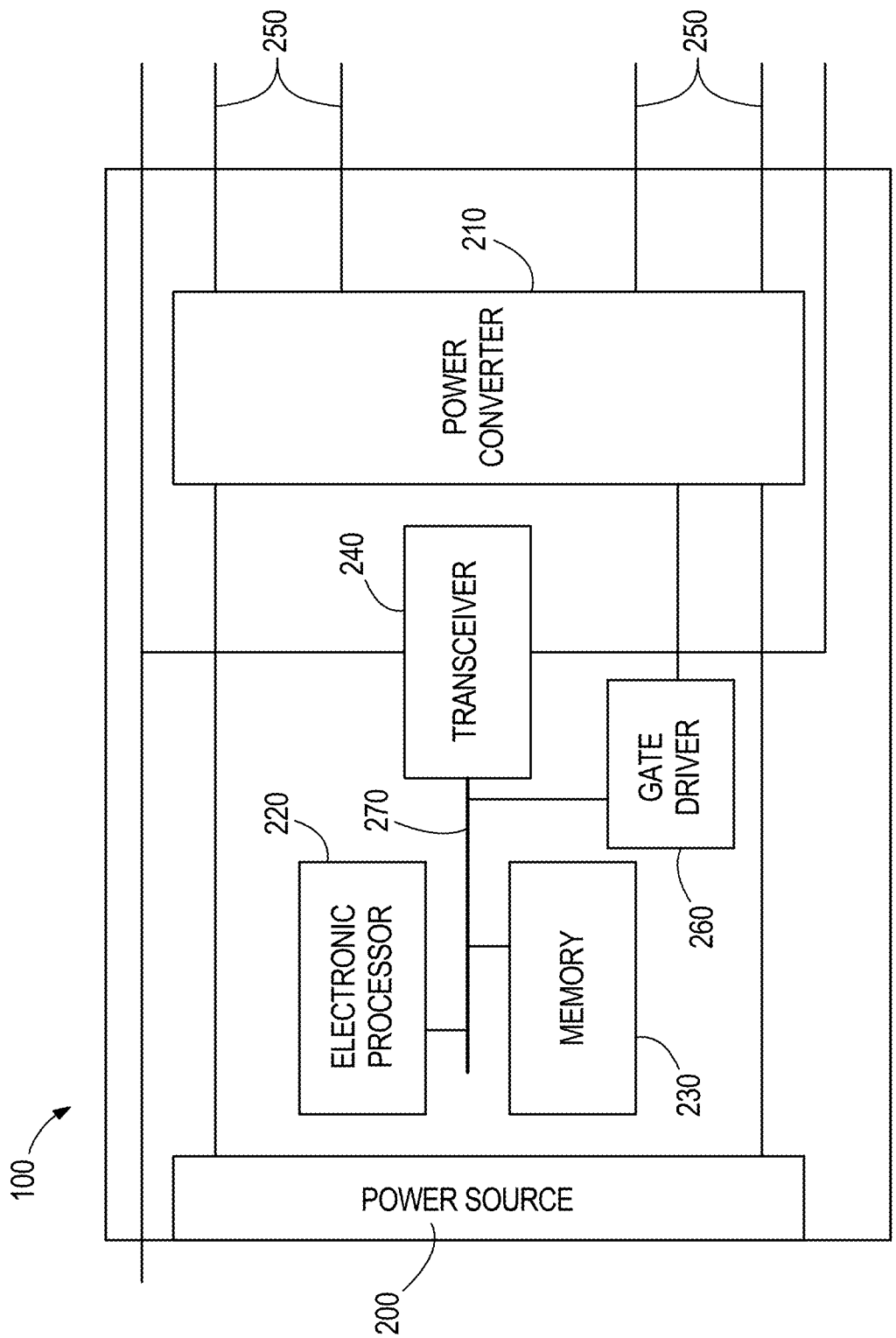
FIG. 2 is a simplified block diagram of the power converter device of FIGS. 1A-1C, in accordance with some embodiments.

FIG. 2 illustrates one example embodiment of a power converter device 100 including a power source 200, a power converter 210, an electronic processor 220, a memory 230, transceiver 240, one or more power outputs 250 (e.g., to a load), and a gate driver 260. In some embodiments, the power source 200 is an AC power source and provides AC power to the power converter 210. For example, the power source 200 receives AC power from the power cords 120, 150 and provides the AC power to the power converter 210. In other embodiments, the power source 200 is a DC power source and provides DC power to the power converter 210. For example, the power source 200 includes the heavy duty battery packs received in the portable power source 100C and provides the DC power from the battery packs to the power converter 210.

The power converter 210 is configured as, for example, an inverter (shown in FIGS. 3 and 4), a flyback converter (shown in FIG. 5), an active clamp flyback converter (shown in FIG. 6), an LLC converter (shown in FIG. 7), a PFC converter (shown in FIG. 8), and the like. The power converter 210 receives power from the power source 200 in one form (e.g., DC or AC) or at a first voltage and converts the power to another form (e.g., the other of DC or AC) or at a second voltage to provide the power at the one or more power outputs 250. Additional details regarding the power converter 210 are provided below for each respective power converter configuration.

The memory 230 includes read only memory (ROM), random access memory (RAM), other non-transitory computer-readable media, or a combination thereof. The electronic processor 220 is configured to communicate with the memory 230 to store data and retrieve stored data. The electronic processor 220 is configured to receive instructions and data from the memory 230 and execute, among other things, the instructions. In particular, the electronic processor 220 executes instructions stored in the memory 230 to perform the functions of the power converter device 100, including, for example, controlling switching elements of the power converter 210. In some embodiments, the electronic processor 220 and the memory 230 are part of a microcontroller integrated circuit, rather than, for example, separate elements mounted on a circuit board. In some embodiments, the electronic processor 220 is a microprocessor with a separate memory (e.g., memory 230). In some embodiments, the electronic processor 220 is a microcontroller including a memory and the memory 230 may not be needed or may be modified accordingly. The electronic processor 220 may be implemented as a field programmable gate array, an application specific integrated circuit, a hardware implemented state machine, and the like. In other embodiments, the electronic processor 220 may be implemented as an integrated circuit dedicated to controlling the various switching devices described herein. In some embodiments, the electronic processor 220 may be implemented using multiple processors.

The transceiver 240 allows for wired or wireless communication between the power converter device 100 and other devices, for example, the power tool battery pack, the heavy duty power tools, the heavy duty battery packs, and the like. In some embodiments, the transceiver 240 may include both a transmitter and a receiver. In other embodiments, the transceiver 240 may include a single device for transmitting and receiving.

The power converter 210 includes one or more FETs, for example, wide bandgap FETs that are driven by the gate driver 260. The gate driver 260 receives control signals from the electronic processor 220 over a communication bus 270 to control operation of the FETs. The electronic processor 220 and the gate driver 260 provide pulse width modulated (PWM) signals to the FETs to switch the FETs at a particular frequency with a particular duty ratio depending on the conversion requirements of the power converter device 100.

Figure 3:
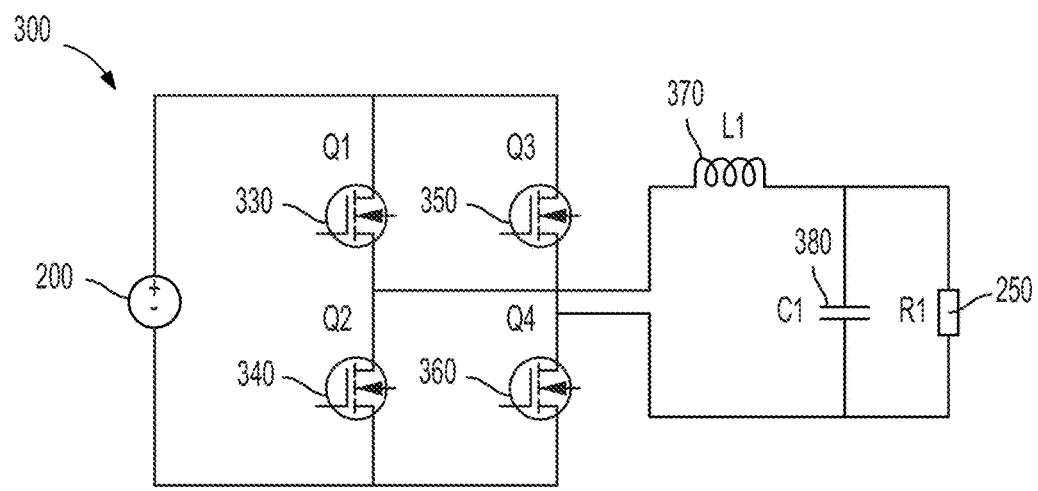
FIG. 3 is a simplified block diagram of a Full-bridge converter used as a power converter in the power converter device of FIGS. 1A-1C, in accordance with some embodiments.

FIG. 3 illustrates one example embodiment of a Full-Bridge converter 300 that is used as the power converter 210. In the example illustrated, the Full-Bridge converter 300 is a DC-to-AC converter that converts DC power from a power source 200 to AC power at the power output 250 (e.g., to a load). The Full-Bridge converter 300 includes a first high-side field effect transistor (FET) 330, a first low-side FET 340, a second high-side FET 350, a second low-side FET 360, an inductor 370, and a capacitor 380. The Full-Bridge converter 300 may include more or fewer components than those illustrated in FIG. 3.

The drain of the first high-side FET 330 is coupled to the positive side of the power supply 200 and the source of the first high-side FET 330 is coupled to a connection point 335. The drain of the first low-side FET 340 is coupled to the connection point 335 and the source of the first low-side FET 340 is coupled to the negative side of the power supply 200. The drain of the second high-side FET 350 is coupled to the positive side of the power supply 200 and the source of the second high-side FET 350 is coupled to a connection point 355. The drain of the second low-side FET 360 is coupled to the connection point 355 and the source of the second low-side FET 360 is coupled to the negative side of the power supply 200. The gates of the FETs 330, 340, 350, 360 are coupled to the gate driver 260 controlled by the electronic processor 220. The electronic processor 220 provides control signals to the gate driver 260 to control operation of the FETs 330, 340, 350, 360. Particularly, the electronic processor 220 controls the FETs 330, 340, 350, 360 by providing a pulse width modulated (PWM) signal at the gates of the FETs 330, 340, 350, 360.

The capacitor 380 is coupled in parallel with the load 250 and the inductor 370 is coupled in series with the load 250 and the capacitor 380. The inductor 370 is coupled on a positive side of the load 250. The FETs 330, 340, 350, 360 are controlled in a complementary fashion such that the first high-side FET 330 and the second low-side FET 360 are operated for a first half of a time period and the second high-side FET 350 and the first low-side FET 340 are operated for a second half of a time period. For the first half of the time period, the current flows from the positive side of the power source 200 to the positive side of the load 250 thereby providing a positive half of an alternating current cycle at the load 250. For the second half of the time period, the current flows from the positive side of the power source 200 to the negative side of the load 250 thereby providing a negative half of the alternating current cycle at the load 250.

Typically, metal oxide semiconductor field effect transistors (MOSFETs) are used in the Full-Bridge converter. MOSFETs are inefficient when operated at high frequencies and lose a high amount of energy. To dissipate the losses of the MOSFETs, additional circuitry and heat sinking features are used that add to the size and weight of the portable power supply. Also, in order to increase the efficiency, MOSFETs are operated at lower switching frequencies, as the switching frequency decreases, the size of the passive components in the circuit like inductors and capacitors will increase, which, in turn, increases the size and weight of the portable power supply. Larger heat sinks are also needed to absorb the energy lost as heat from the MOSFETs.

In the Full-Bridge converter 300, rather than MOSFETs, wide bandgap semiconductor FETs are used for the FETs 330, 340, 350, 360. Wide bandgap semiconductors are made from, for example, Gallium Nitrite (GaN), Silicon Carbide (SiC), or the like, and have a bandgaps in the range of, for example, about 3-4 electronvolts (eV). Wide bandgap semiconductors exhibit several properties that provide advantages over MOSFETs. Particularly, wide bandgap semiconductors can be operated at very high frequencies, for example, at 100 kHz, 200 kHz, 400 kHz, and more while losing less energy as heat than MOSFETs operating at lower frequencies, for example, 25 kHz, 50 kHz, and the like.

Because the wide bandgap semiconductors can be operated at very high frequencies, the power converters 210 using the wide bandgap semiconductors provide higher resolution signals at the outputs. Smaller passive components and/or filter components, that is, inductors and capacitors, can be used due to the high resolution of output signals at the power converters 210. Additionally, smaller heat sinks and fans can be used because the wide bandgap semiconductors operate more efficiently than MOSFETs and therefore produce less heat during operation. Energy storage capacity can also be reduced for the same total output energy rating caused by the increased frequency during operation of the wide bandgap semiconductors compared to MOSFETs. Accordingly, the size and weight of the components can be reduced and efficiency of the power converter devices 100 can be improved by replacing MOSFETs with wide bandgap semiconductor devices.

Figure 4:
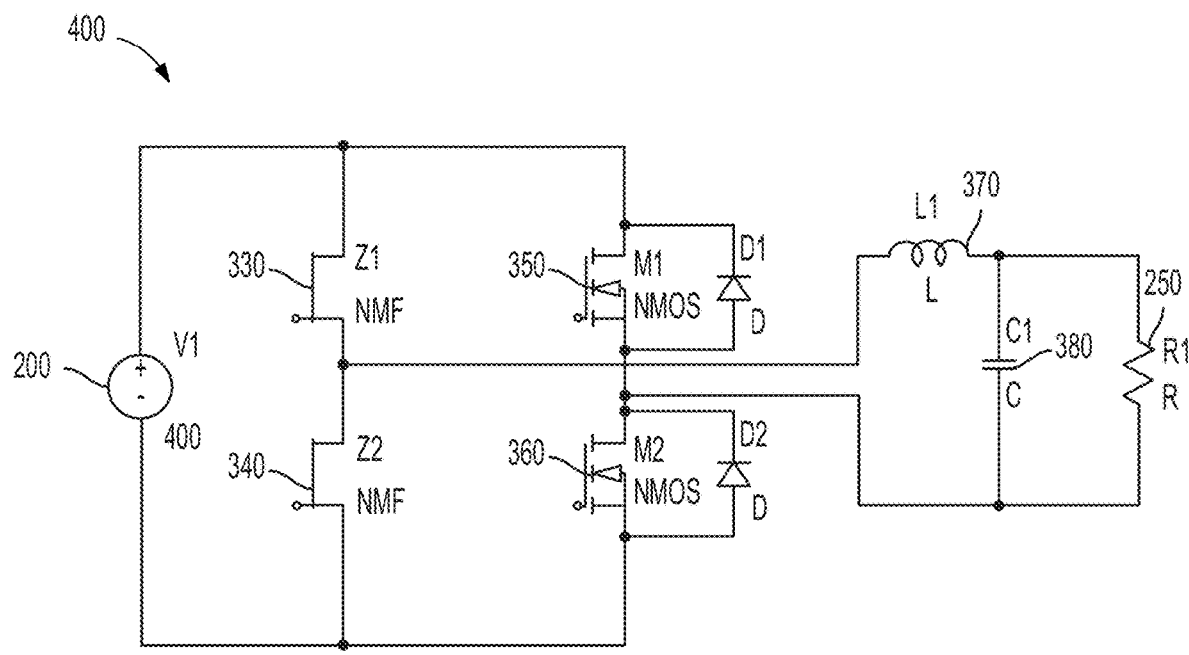
FIG. 4 is a simplified block diagram of a Full-bridge converter used as a power converter in the power converter device of FIGS. 1A-1C, in accordance with some embodiments.

FIG. 4 illustrates one example embodiment of a hybrid Full-Bridge converter 400 that can be used as the power converter 210. In the example illustrated, the Full-Bridge converter 400 is similar in construction and operation to the Full-bridge converter 300 of FIG. 3. The Full-Bridge 400 differs in that wide bandgap FETs are used for the first high-side FET 330 and the first low-side FET 340 and MOSFETs are used for the second high-side FET 350 and the second low-side FET 360. In other embodiments, any combination of wide bandgap FETs and MOSFETs may be used in the Full-bridge converter 300. The distribution of wide bandgap FETs and MOSFETs between the FETs 330, 340, 350, 360 may be determined based on the desired operation of the power converter 210.

In one example, where the low-side FETs 340, 360 are switched at a higher frequency than the high-side FETs, wide bandgap FETs are used for the low-side FETs 340, 360 and MOSFETs are used for the high-side FETs 330, 350. Similarly, in another example in which the second FETs 350, 360 are switched at a higher frequency than the first FETs 330, 340, wide bandgap FETs are used for the second FETs 350, 360 and MOSFETs are used for the first FETs 330, 340. In other words, where some FETs in a converter are switched at a higher frequency than other FETs, the FETs switched at a higher frequency may be replaced with the wide bandgap FETs because, as noted earlier, wide bandgap switches are configured to switch at a higher rate with less accommodations (e.g., for space and heat generation) than MOSFETs. Accordingly, in some embodiments, the desired operation of the power converter 210, heat generation reduction, and size reduction, may still be fulfilled by using one or more wide bandgap FETs together with one or more MOSFETs in the power converter 210, while reducing the cost of the power converter 210 relative to a power converter 210 that uses all wide bandgap FETs, which are typically more expensive than MOSFETs.

Figure 5:
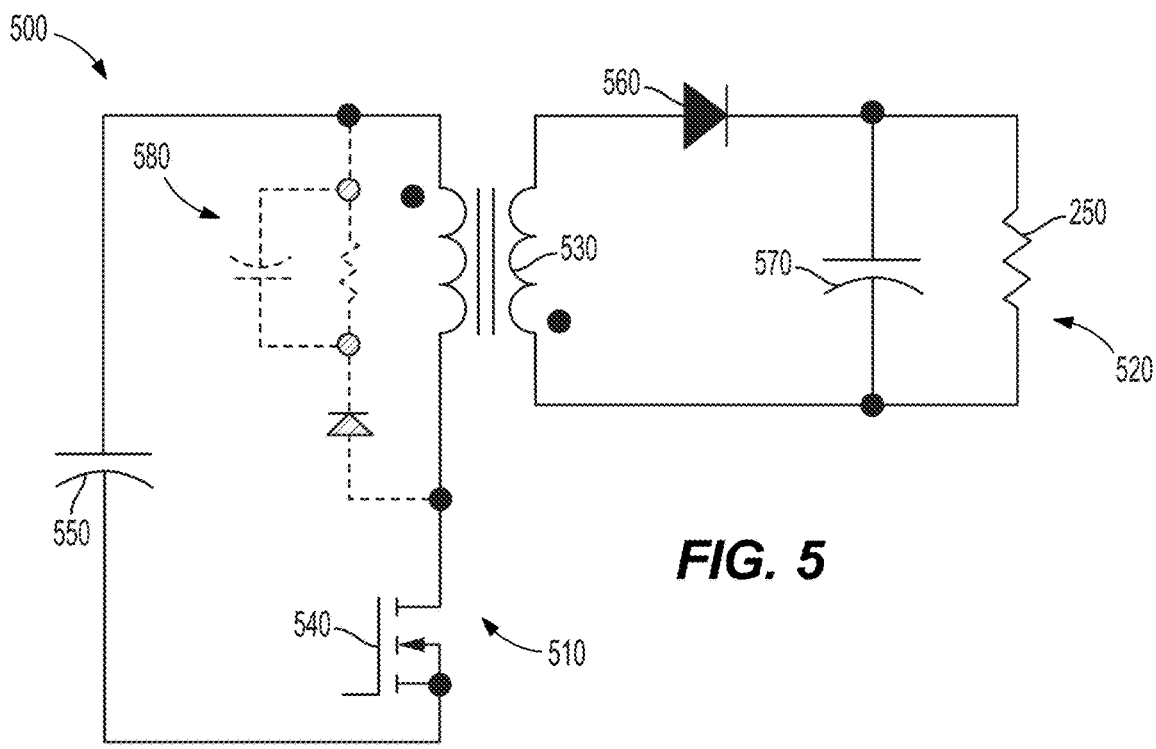
FIG. 5 is a simplified block diagram of a flyback converter used as a power converter in the power converter device of FIGS. 1A-1C, in accordance with some embodiments.

FIG. 5 illustrates one example embodiment of a flyback converter 500 that can be used in the power converter 210. The flyback converter 500 may be used as a boost or buck DC-to-DC converter within the power converter 210. In the example illustrated, the flyback converter 500 receives power from the power source 200 and includes a primary side circuit 510 and a secondary side circuit 520 coupled by a two winding inductor 530. The flyback converter 500 may include more or fewer components than those illustrated in FIG. 5.

The primary side circuit 510 includes a flyback switching FET 540 coupled in series with a primary side of the two winding inductor 530 and an input capacitor 550 coupled in parallel to the flyback switching FET 540 and the two winding inductor 530. The input capacitor 550 is coupled in parallel to the power source 200. A passive clamp resistorcapacitor-diode (RCD) snubber circuit 580 may also be provided in series with the flyback switching FET 540 and in parallel to the primary side of the two winding inductor 530. The passive clamp RCD snubber circuit limits voltage spikes on the flyback switching FET 540. The secondary side circuit 520 includes an output diode 560 and an output capacitor 570. The output diode 560 is coupled in series on a positive side of a secondary side of the two winding inductor 530. The output capacitor 570 is coupled in parallel to the secondary side of the two winding inductor 530 downstream of the output diode 560. A load 250 is coupled in parallel to the output capacitor 570.

During operation, the flyback switching FET 540 is turned on to store energy from the power source 200 on the two winding inductor 530. During the on-time of the flyback switching FET 540, the output capacitor 570 provides the operating power to the load 250. When the flyback switching FET 540 is turned off, the energy stored on the two winding inductor 530 is transferred to the output capacitor 570 and the load 250. In the example illustrated, a wide bandgap FET is used as the flyback switching FET 540 to enable high-frequency operation. The flyback switching FET 540 is driven by a gate driver 260 controlled by the electronic processor 220. The electronic processor 220 provides control signals to the gate driver 260 to control the operation of the flyback switching FET 540. In some embodiments, a wide bandgap FET may be used to replace the diode 560 to further increase the frequency of operation for the flyback converter 500.

Figure 6:
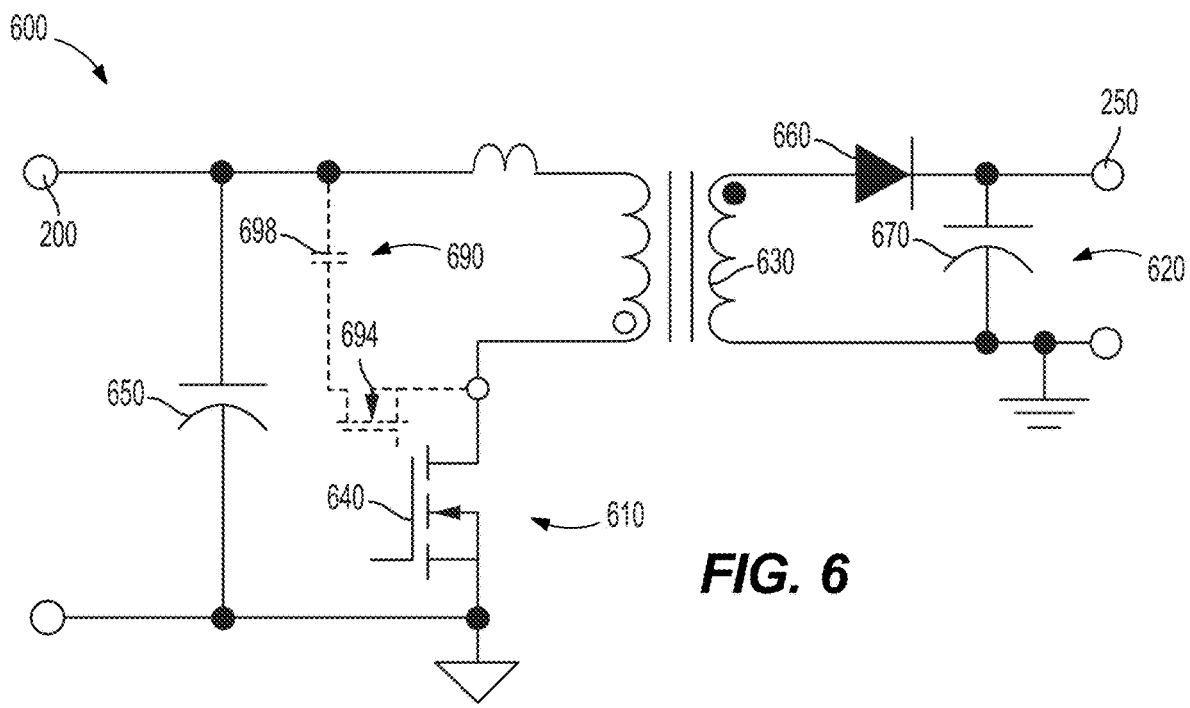
FIG. 6 is a simplified block diagram of an active clamp flyback converter used as a power converter in the power converter device of FIGS. 1A-1C, in accordance with some embodiments.

FIG. 6 illustrates one example embodiment of an active clamp flyback converter 600 that can be used in the power converter 210. The active clamp flyback converter 600 may be used as a boost or buck DC-to-DC converter within the power converter 210. In the example illustrated, the active clamp flyback converter 600 receives power from the power source 200 and includes a primary side circuit 610 and a secondary side circuit 620 coupled by a two winding inductor 630. The active clamp flyback converter 600 may include more or fewer components than those illustrated in FIG. 6.

The primary side circuit 610 includes a flyback switching FET 640 coupled in series with a primary side of the two winding inductor 630 and an input capacitor 650 coupled in parallel to the flyback switching FET 640 and the two winding inductor 630. The input capacitor 650 is coupled in parallel to the power source 200. The secondary side circuit 620 includes an output diode 660 and an output capacitor 670. The output diode 660 is coupled in series on a positive side of a secondary side of the two winding inductor 630. The output capacitor 670 is coupled in parallel to the secondary side of the two winding inductor 630 downstream of the output diode 660. A load 250 is coupled in parallel to the output capacitor 670.

The primary side circuit 610 also includes an active clamp circuit 690 including a clamp FET 694 and a clamp capacitor 698 connected in series. The active clamp circuit 690 is connected in parallel with the primary side of the two winding inductor 630 and in series with the flyback switching FET 640.

During operation, the flyback switching FET 640 is turned on to store energy from the power source 200 on the two winding inductor 630. During the on-time of the flyback switching FET 640, the output capacitor 670 provides the operating power to the load 250. When the flyback switching FET 640 is turned off, the energy stored on the two winding inductor 630 is transferred to the output capacitor 670 and the load 250. The clamp FET 694 is turned on during the off state of the flyback switching FET 640 to reduce the stress on the flyback switching FET 640. In the example illustrated, a wide bandgap FET is used for one or more of the flyback switching FET 640, the output diode 660, and the clamp FET 694 based on the desired characteristics of the power converter 210. Particularly, by using wide bandgap FETS, the size of the inductive and capacitor components may be reduced compared to an active clamp flyback converter using MOSFETs for the flyback switching FET 640 and the clamp FET 694. The flyback switching FET 640 and the clamp FET 694 are driven by a gate driver 260 controlled by the electronic processor 220. The electronic processor 220 provides control signals to the gate driver 260 to control the operation of the flyback switching FET 640 and the clamp FET 694.

Figure 7:
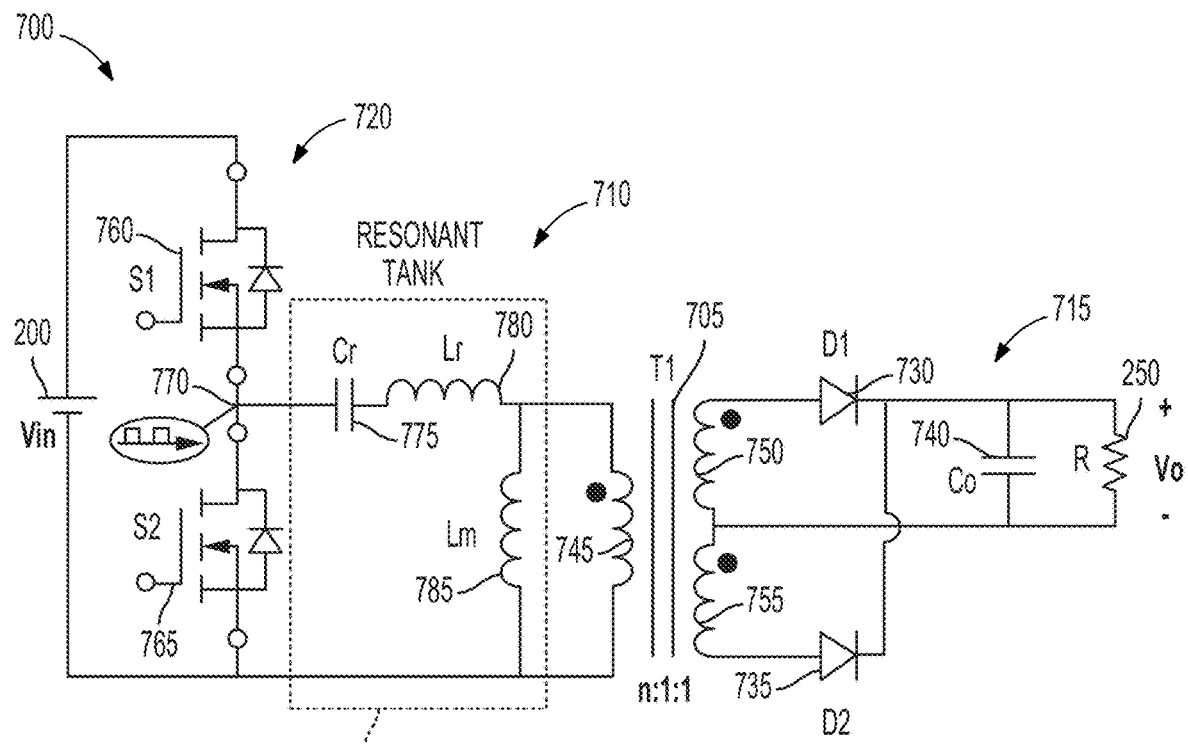
FIG. 7 is a simplified block diagram of an LLC converter used as a power converter in the power converter device of FIGS. 1A-1C, in accordance with some embodiments.

FIG. 7 illustrates one example embodiment of an LLC converter 700 that can be used as the power converter 210. In the example illustrated, the LLC converter includes a transformer 705 connecting a primary side circuit 710 to a secondary side circuit 715. The primary side circuit 710 includes a half bridge 720 and a resonant tank 725. The secondary side circuit 715 includes a first output diode 730, a second output diode 735, and an output capacitor 740. The transformer 705 includes one primary winding 745 connected to the primary side circuit 710 and a first secondary windings 750 and second secondary winding 755 connected to the secondary side circuit 715. The LLC converter 700 may include more or fewer components than those illustrated in FIG. 7.

The half bridge 720 includes a high-side FET 760 and a low side FET 765 connected in series with the source of the high-side FET 760 connected to a drain of the low side FET 765 at a connection point 770. The FETs 760, 765 are driven by a gate driver 260 controlled by the electronic processor 220. The electronic processor 220 provides control signals to the gate driver 260 to operate the FETs 760, 765. The half bridge 720 is coupled in parallel to the power source 200. In some embodiments, the primary side circuit 710 may include a full bridge with additional high-side and low-side FETs.

The resonant tank 725 includes a capacitor 775 and a first inductor 780 connected in series and to the connection point 770. The capacitor 775 and the first inductor 780 are also in series with the primary winding 745. The resonant tank 725 also includes a second inductor 785, which is a magnetizing inductance of the transformer 705, and is connected in series to the capacitor 775 and the first inductor 780 and in parallel to the primary winding 745.

The first output diode 730 is connected in series with the first secondary winding 750 and the second output diode 735 is connected in series with the second secondary winding 755. The output capacitor 740 is connected in parallel to the first secondary winding 750 and the second secondary winding 755. The output capacitor 740 is also connected in parallel to a load 250. In some embodiments, the secondary side circuit 715 may also include a full bridge of diodes.

During operation, the electronic processor 220 controls the switching of the high-side FET 760 and the low-side FET 765 to convert AC voltage from the power source 200 to DC voltage at the load 250. Wide bandgap FETs are used instead of MOSFETs for the high-side FET 760 and the low-side FET 765. Use of the wide bandgap FETs results in an LLC converter that is smaller in size and more efficient than an LLC converter including MOSFETs. Wide bandgap devices may also be used for the diodes in the secondary side circuit 715.

Figure 8:
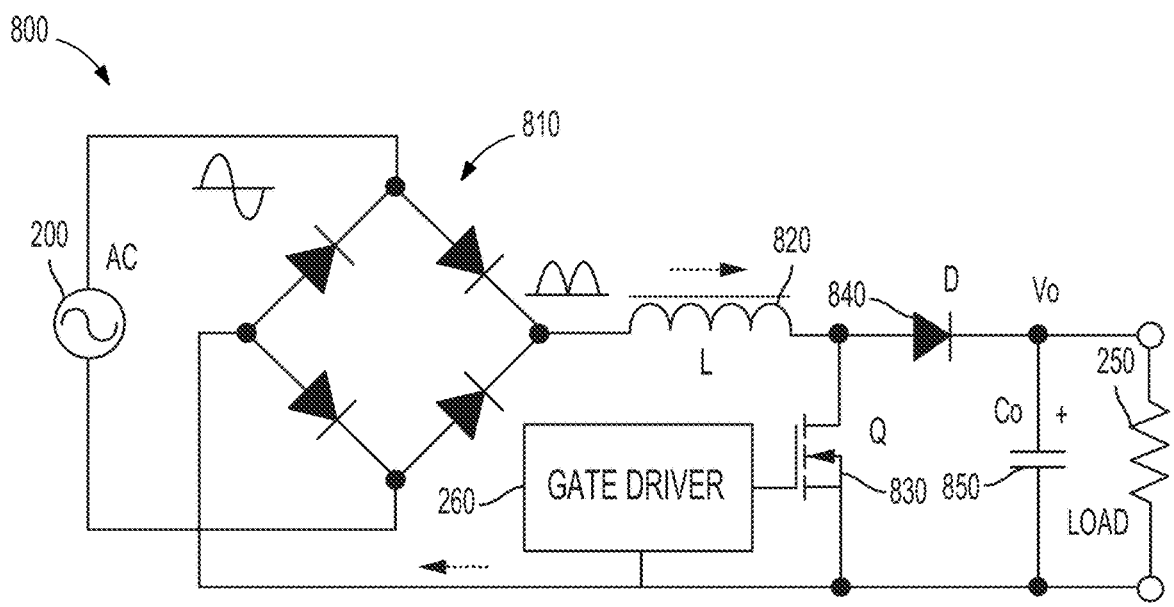
FIG. 8 is a simplified block diagram of a power factor conversion (PFC) converter used as a power converter in the power converter device of FIGS. 1A-1C, in accordance with some embodiments.

FIG. 8 illustrates one example embodiment of a power factor correction (PFC) converter 800 that can be used as the power converter 210. The PFC converter 800 includes a diode rectifier 810, an inductor 820, a converter FET 830, an output diode 840, an output capacitor 850, and a gate driver 260. The diode rectifier 810 receives AC input voltage from an AC power source, for example, the power source 200. The diode rectifier 810 rectifies the AC voltage into a rectified AC voltage at the output.

The inductor 820 is connected in series with the diode rectifier 810 to receive the rectified voltage. The output diode 840 and the output capacitor 850 are connected in series with the inductor 820. The load 250 is connected in parallel to the output capacitor 850 and in series with the output diode 840. The converter FET 830 is connected in series with the inductor 820 and in parallel to the output diode 840 and the output capacitor 850.

The gate driver 260 drives the converter FET 830 to operate the PFC converter 800. The gate driver 260 receives control signals from the electronic processor 220 to control the operation of the converter FET 830. The electronic processor 220 implements a power factor control algorithm to drive the converter FET 830 and convert AC voltage to DC voltage at the load 250. A wide bandgap FET is used for the converter FET 830 to increase efficiency and reduce the size of the PFC converter 800.

Figure 9:
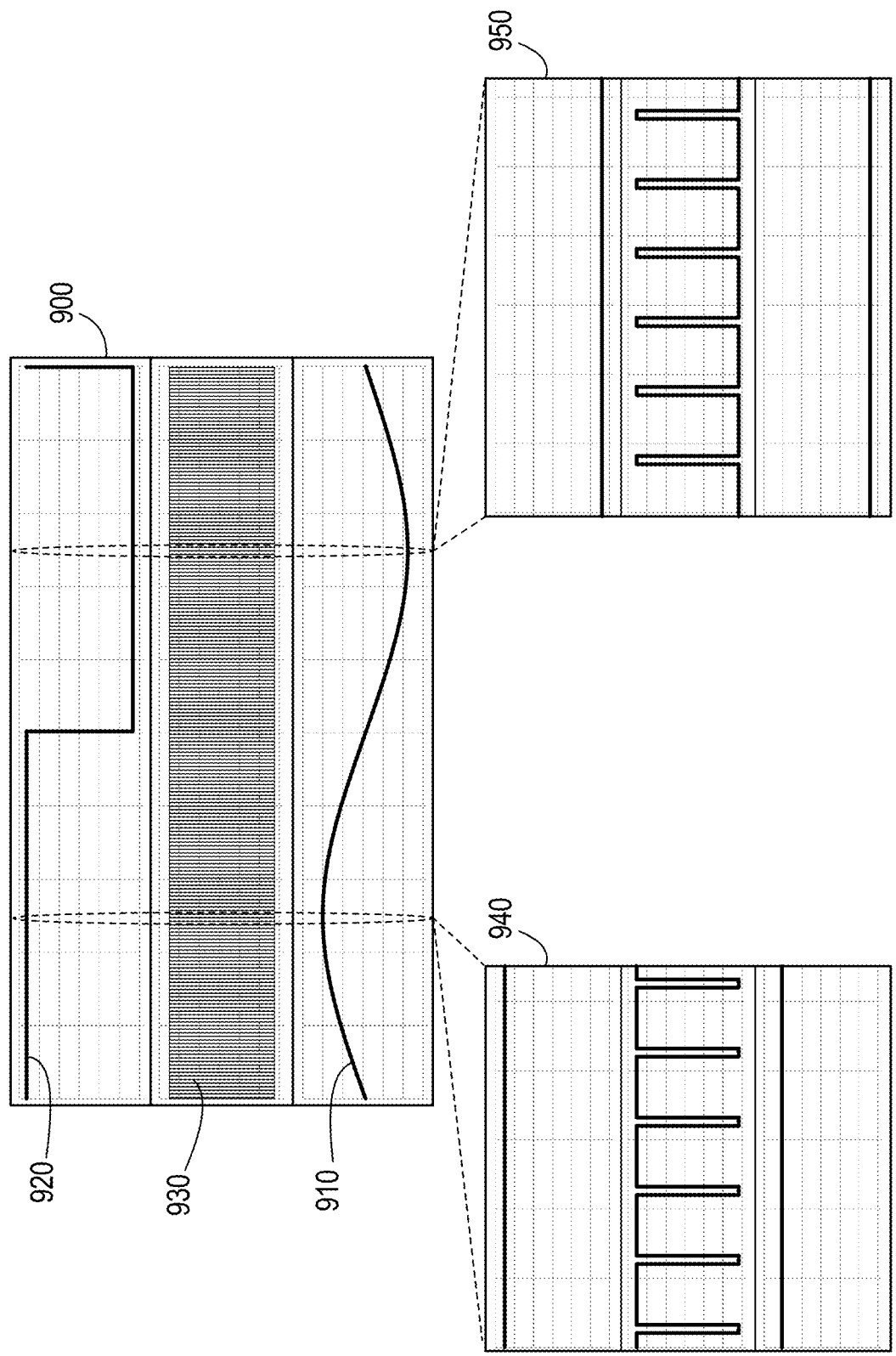
FIG. 9 is a timing diagram illustrating the difference in operation of a wide bandgap FET and a MOSFET for converting power from one form to another form, in accordance with some embodiments.

FIG. 9 illustrates a timing chart 900 of one example implementation of the power converter 210 showing the differences between the operation of a MOSFET and a wide bandgap FET in the power converter 210. The power converter 210 is used in this implementation to convert DC power to an AC output at 60 Hz. The output AC signal 910 is illustrated at the bottom of the timing chart 900 and includes a sine wave output having a frequency of 60 Hz. In a power converter 210 using a MOSFET, the MOSFET is controlled at a frequency (e.g., a second frequency) similar to the output frequency of the AC output. That is, the MOSFET is controlled at 60 Hz to convert the DC input to the AC output. A PWM signal of 60 Hz is input to the gate driver to drive the MOSFET. The MOSFET timing waveform 920 is shown at the top of the timing chart 900.

In a power converter 210 using a wide bandgap FET, the wide bandgap FET is controlled at a frequency (e.g., a first frequency) much higher than the output frequency of the AC output of the frequency of the PWM signal provided to the MOSFETs. In one example, the wide bandgap FETs may be controlled by providing a PWM signal having a frequency between 100 kHz-400 kHz. The wide bandgap FET timing waveform 930 is shown in the middle of the timing chart 900. A zoomed in version during a positive phase 940 illustrates the respective signals during a positive phase of the AC output signal. A zoomed in version during a negative phase 950 illustrates the respective signals during a negative phase of the AC output signal. The duty ratio of the PWM signal provided to the wide bandgap FET during the positive phase (e.g., 90%) is much higher than the duty ratio during the negative phase (e.g., 10%). Controlling the FETs with high frequency allows for a smoother AC output signal and improves the efficiency of the power converter 210.

Thus, various embodiments described herein provide for power converter devices having wide bandgap semiconductors. Various features and advantages are set forth in the following claims.

I claim:

1. A power supply system comprising:
a power source;
an output;
a power converter coupled between the power source and the output and configured to convert power received from the power source, the power converter including a first switch, wherein the power source is a battery having a nominal voltage between 12 V and 80 V; and
an electronic processor coupled to the power converter and configured to control operation of the power converter by controlling the first switch at a switching frequency of at least 100 kHz.

2. The power supply system of claim 1, wherein the battery is a power tool battery pack.

3. The power supply system of claim 1, wherein the power converter includes an inverter including the first switch and is configured to convert direct-current (DC) power received from the power source to alternating-current (AC) power, wherein the AC power is provided at the output.

4. The power supply system of claim 3, wherein the power converter further includes a DC-to-DC converter configured to:
convert the DC power received from the power source at a first voltage to DC power at a second voltage, and
provide the DC power at the second voltage to the inverter,
wherein the DC-to-DC converter includes a second switch.

5. The power supply system of claim 4, wherein the electronic processor controls the second switch at a switching frequency of at least 200 kHz.

6. The power supply system of claim 3, wherein the inverter includes:
a first bridge circuit having a first high-side FET and a first low-side FET; and
a second bridge circuit having a second high-side FET and a second low-side FET,
wherein at least one of the first high-side FET, the first low-side FET, the second high-side FET, and the second low-side FET is the first switch, and
wherein at least another of the first high-side FET, the first low-side FET, the second high-side FET, and the second low-side FET is a metal oxide semiconductor field effect transistor (MOSFET).

7. The power supply system of claim 6, wherein:
the first high-side FET is the first switch and the first low-side FET is a second switch; and
the second high-side FET and the second low-side FET are MOSFETs.

8. The power supply system of claim 6, wherein:
the first high-side FET is the first switch and the second high-side FET is a second switch; and
wherein the first low-side FET and the second low-side FET are MOSFETs.

9. The power supply system of claim 6, wherein:
the first low-side FET is the first switch and the second low-side FET is a second switch; and
wherein the first high-side FET and the second high-side FET are MOSFETs.

10. The power supply system of claim 6, wherein:
the electronic processor operates the first switch at a first frequency and operates the MOSFET at a second frequency; and
wherein the first frequency is higher than the second frequency.

11. The power supply system of claim 1, wherein:
the power converter includes a DC-to-DC converter having the first switch and is configured to convert DC power received from the power source at a first voltage to a second voltage; and
the DC power at the second voltage is provided at the output.

12. The power supply system of claim 1, wherein the electronic processor controls the first switch at a switching frequency between 100 kHz and 400 kHz.

13. A power supply system comprising:
a power source, wherein the power source is a battery having a nominal voltage between 12 V and 80 V;
an output;
an inverter coupled between the power source and the output and configured to convert power received from the power source, the inverter including a first wide bandgap field effect transistor (FET); and
an electronic processor coupled to the inverter and configured to control operation of the inverter by controlling the first wide bandgap FET at a switching frequency of at least 100 kHz.

14. The power supply system of claim 13, wherein the electronic processor controls a second wide bandgap FET at a switching frequency of at least 200 kHz.

15. The power supply system of claim 13, wherein the inverter includes:
a first bridge circuit having a first high-side FET and a first low-side FET; and
a second bridge circuit having a second high-side FET and a second low-side FET,
wherein at least one of the first high-side FET, the first low-side FET, the second high-side FET, and the second low-side FET is the first wide bandgap FET, and
wherein at least another of the first high-side FET, the first low-side FET, the second high-side FET, and the second low-side FET is a metal oxide semiconductor field effect transistor (MOSFET).

16. The power supply system of claim 15, wherein:
the electronic processor operates the first wide bandgap FET at a first frequency and operates the MOSFET at a second frequency; and
wherein the first frequency is higher than the second frequency.

17. The power supply system of claim 13, wherein the electronic processor controls the first wide bandgap FET at a switching frequency between 100 kHz and 400 kHz.

18. A power supply system comprising:
a power source;
an input configured to receive AC power from an external source;
an output;
a first power converter coupled between the power source and the output and configured to convert power received from the power source, the power converter including a first switch;
a second power converter coupled between the input and the power source and configured to convert the AC power received from the input, the second power converter including a second switch; and
an electronic processor coupled to the power converter and configured to control operation of the power converter by controlling the first switch at a switching frequency of at least 100 kHz.

19. The power supply system of claim 18, wherein the second power converter includes an AC-to-DC converter having the first second switch and configured to convert the AC power received from the input to DC power provided to the power source for charging the power source.

20. A power supply system comprising:
a power source;
an input configured to receive AC power from an external source;
an output;
an inverter coupled between the power source and the output and configured to convert power received from the power source, the inverter including a first wide bandgap field effect transistor (FET);
a power converter coupled between the input and the power source and configured to convert the AC power received from the input, the power converter including a second wide bandgap FET; and
an electronic processor coupled to the inverter and configured to control operation of the inverter by controlling the first wide bandgap FET at a switching frequency of at least 100 kHz.

21. The power supply system of claim 20, wherein the power converter includes an AC-to-DC converter having the second wide bandgap FET and configured to convert the AC power received from the input to DC power provided to the power source for charging the power source.

* * * * *